United States Patent
Chung et al.

(10) Patent No.: US 7,658,147 B2
(45) Date of Patent: Feb. 9, 2010

(54) PRINTING SYSTEM AND METHOD FOR MANUFACTURING LIQUID CRYSTAL DISPLAY DEVICE USING THE SAME

(75) Inventors: In Jae Chung, Gwacheon-si (KR); KiYong Kim, Gwacheon-si (KR); Jung Jae Lee, Gwacheon-si (KR); Tae Young Oh, Anyang-si (KR); Hong Suk Yoo, Gunpo-si (KR); Chul Ho Kim, Paju-si (KR)

(73) Assignee: LG. Display Co., Ltd., Seoul (KR)

( * ) Notice: Subject to any disclaimer, the term of this patent is extended or adjusted under 35 U.S.C. 154(b) by 402 days.

(21) Appl. No.: 11/479,135

(22) Filed: Jun. 29, 2006

(65) Prior Publication Data

US 2007/0119322 A1    May 31, 2007

(30) Foreign Application Priority Data

Nov. 28, 2005 (KR) .......................... P2005-0114167

(51) Int. Cl.
*B41F 33/00* (2006.01)

(52) U.S. Cl. ...................................... 101/483; 101/423

(58) Field of Classification Search ................ 101/483, 101/423
See application file for complete search history.

(56) References Cited

U.S. PATENT DOCUMENTS

| | | | |
|---|---|---|---|
| 5,163,235 A | | 11/1992 | Hoffmann et al. |
| 5,335,595 A | | 8/1994 | Yamashita et al. |
| 5,367,953 A | * | 11/1994 | Yamashita et al. .......... 101/158 |
| 5,533,447 A | * | 7/1996 | Johnson et al. ............. 101/211 |
| 6,732,643 B2 | * | 5/2004 | Kwon et al. ................. 101/170 |
| 6,759,348 B1 | * | 7/2004 | Cho et al. .................... 438/778 |
| 6,835,583 B2 | * | 12/2004 | Yi et al. ......................... 438/30 |
| 6,999,148 B2 | * | 2/2006 | Lee ........................... 349/124 |
| 2003/0081095 A1 | | 5/2003 | Yi et al. |
| 2004/0123753 A1 | | 7/2004 | Yoo et al. |

FOREIGN PATENT DOCUMENTS

| | | |
|---|---|---|
| JP | 03-295649 | 12/1991 |
| JP | 11-058921 | * 2/1999 |
| JP | 11-254655 | 9/1999 |
| JP | 2004-153290 | 5/2004 |
| JP | 2005-070669 | 3/2005 |
| WO | WO 90/05065 | 5/1990 |
| WO | WO 93/19483 | 9/1993 |

OTHER PUBLICATIONS

Search Report dated Apr. 20, 2007 for corresponding European Patent Application No. 06116151.9.
Office Action issued in corresponding Japanese Patent Application No. 2006-172219; issued on Aug. 17, 2009.

* cited by examiner

*Primary Examiner*—Anthony H. Nguyen
(74) *Attorney, Agent, or Firm*—Brinks Hofer Gilson & Lione

(57) ABSTRACT

A printing system comprises a moving rail, a cliché plate and a substrate positioned on the moving rail, a printing roller that transcribes a pattern material on the substrate by passing through the cliché plate. The printing system further comprises a cleaning unit that cleans the cliché plate.

18 Claims, 9 Drawing Sheets

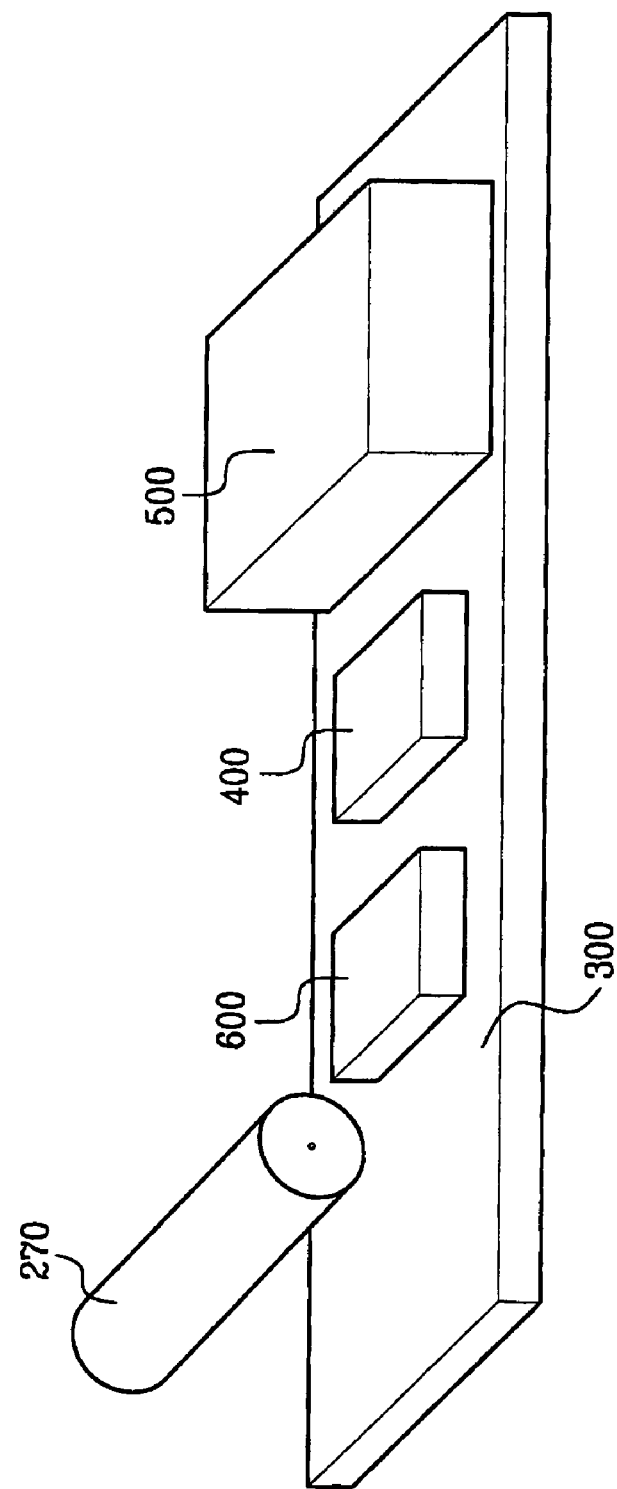

PRINTING SYSTEM AND METHOD FOR MANUFACTURING LIQUID CRYSTAL DISPLAY DEVICE USING THE SAME

This application claims the benefit of the Korean Patent Application No. P2005-114167, filed on Nov. 28, 2005, which is hereby incorporated by reference.

FIELD

The present invention relates to a liquid crystal display (LCD) device, and more particularly, to a printing system for forming a pattern of an LCD device.

BACKGROUND

Among various ultra-thin flat type display devices, which include a display screen having a thickness of several centimeters, a liquid crystal display (LCD) device are widely used for notebook computers, monitors, aircraft, and etc. since it has advantages such as low power consumption and portability.

The LCD device includes lower and upper substrates facing each other at a predetermined interval therebetween, and a liquid crystal layer formed between the lower and upper substrates. Generally, the lower substrate includes a thin film transistor and a pixel electrode. The upper substrate includes a light-shielding layer, a color filter layer and a common electrode.

As explained above, the LCD device is comprised of various components which are formed by repeated steps. To pattern the components of the LCD device with various shapes, a photolithography process is used necessarily.

Hereinafter, a patterning method using a photolithography process according to the related art will be explained as follows.

First, as shown in FIG. 1A, a pattern material layer 20 is formed on a transparent substrate 10.

Then, as shown in FIG. 1B, after a mask 23 of a predetermined pattern is positioned above the pattern material layer 20, light emitted from a light source is applied to the transparent substrate 10.

Then, as shown in FIG. 1C, a pattern 20a is completed on the transparent substrate 10 by development.

However, the photolithography process has a disadvantage of high manufacturing cost since the photolithography process uses the mask of the predetermined pattern. In addition, the photolithography process requires the exposure and development.

To overcome these disadvantages of the photolithography process, it is necessary to develop a new patterning method.

SUMMARY

A printing system comprises a moving rail, and a cliché plate and a substrate positioned on the moving rail. The printing system further comprises a printing roller that transcribes a pattern material on the substrate by passing through the cliché plate, and a cleaning unit that cleans the cliché plate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a perspective view schematically illustrating a printing system according to the first embodiment of the present invention;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a printing system according to the present invention and a method for manufacturing an LCD device using the printing system will be explained with reference to the accompanying drawings.

Figure 1A:
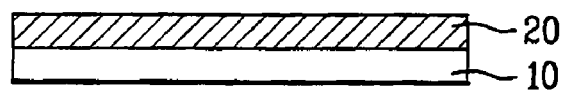
FIGS. 1A to 1C are cross sectional views schematically illustrating a photolithography process according to the related art.
Figure 1B:
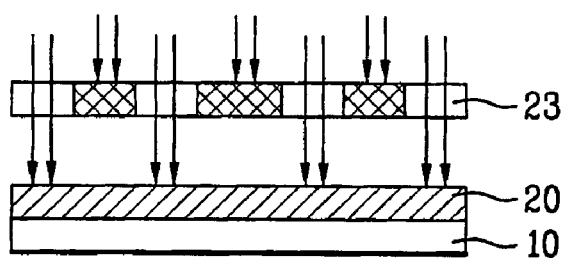
Figure 1C:
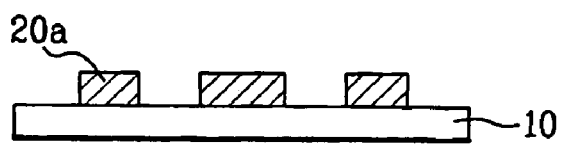
Figure 2A:
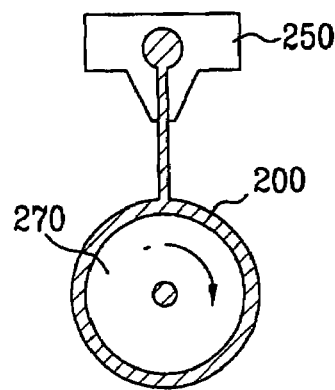
FIGS. 2A to 2C are cross sectional views illustrating a process for patterning a pattern material on a substrate using a printing roller according to the present invention.
Figure 2B:
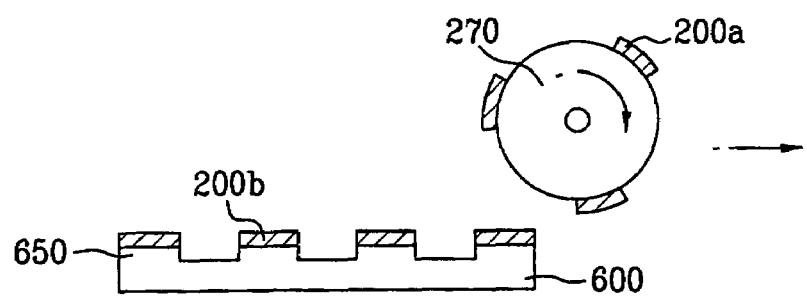
Figure 2C:
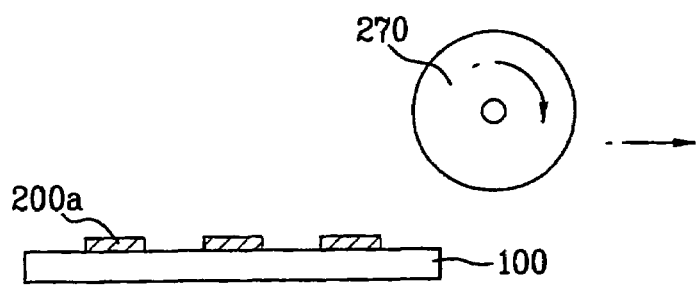

FIGS. 2A to 2C are cross sectional views illustrating a process for patterning a pattern material on a substrate using a printing roller and a cliché plate according to the present invention.

First, as shown in FIG. 2A, a pattern material 200 is supplied through a printing nozzle 250 and is coated on an outer circumferential surface of a printing roller 270.

As shown in FIG. 2B, accordingly as the printing roller 270 coated with the pattern material 200 is rolled on a cliché plate 600 having a plurality of predetermined projections 650, some pattern material 200b is transcribed to the projections 650 of the cliché plate 600. The remaining pattern material 200a is left on the outer circumferential surface of the printing roller 270, whereby the pattern material 200a which is left on the outer circumferential surface of the printing roller 270 is formed in a predetermined pattern.

As shown in FIG. 2C, the printing roller 270, on which the pattern material 200a is left in the predetermined pattern, is rolled on a substrate 100. Accordingly, the remaining pattern material 200a of the printing roller 270 is transcribed to the substrate 100.

The above patterning method using the printing roll and the cliché plate doesn't use a mask of a predetermined pattern. As a result, the above patterning method can decrease manufacturing cost and time since the above patterning method doesn't perform exposure and development.

Also, a cleaning unit for cleaning the cliché plate is positioned inside the printing system.

As shown in FIG. 2B, after using the cliché plate, the pattern material 200b is left on the projections 650 of the cliché plate. To reuse the cliché plate, it is necessary to perform a cleaning process for the cliché plate.

As the cleaning unit for cleaning the cliché plate is provided inside the printing system, it is possible to decrease the manufacturing time. The cleaning unit may include a cleaning part which moves to the cliché plate and cleans the cliché plate. At this time, the printing system may include the cliché plate, the substrate and cleaning unit sequentially arranged in line, or may include the substrate, the cliché plate and the cleaning unit sequentially arranged in line.

The cleaning unit may be positioned outside a moving rail. Also, the printing system may include the cliché plate and the substrate sequentially and linearly arranged on the moving rail, or may include the substrate and the cliché plate sequentially and linearly arranged on the moving rail. The cleaning unit may be positioned at a lateral side of the cliché plate.

Also, the cleaning part may include a cleaning solution sprayer and a dryer. The cleaning unit may include the cleaning part for cleaning the cliché plate, and a container for accommodating a new cliché plate and the cleaned cliché plate.

The cleaning unit may be positioned outside the moving rail. Also, the printing system may include the cliché plate and the substrate sequentially and linearly arranged on the moving rail, or may include the substrate and the cliché plate sequentially and linearly arranged on the moving rail. At this time, the cleaning unit may be positioned at a lateral side of the cliché plate.

The cleaning part may be comprised of a cleaning solution sprayer and a dryer. In addition, the cleaning part may include an additional transporter which transports the cliché plate for the cleaning to the cleaning part and transports the cleaned cliché plate from the container to the moving rail.

If using the cleaning unit including the cleaning part and the container, it is necessary to provide the additional transporter for transporting the cliché plate to the cleaning part.

In another aspect, a method for manufacturing an LCD device according to the present invention includes steps of forming a light-shielding layer on a first substrate; forming a color filter layer on the first substrate including the light-shielding layer; preparing a second substrate; and forming a liquid crystal layer between the first and second substrates.

At least one of the processes of forming the light-shielding layer on the first substrate, and forming the color filter layer on the first substrate including the light-shielding layer is performed with the above-mentioned printing system.

The process of preparing the second substrate using the above-mentioned printing system may be comprised of steps of forming gate and data lines crossing each other to define a pixel region; forming a thin film transistor adjacent to a crossing area of the gate and data lines; and forming a pixel electrode connected with the thin film transistor.

The process of forming the liquid crystal layer between the first and second substrates may be comprised of steps of forming a sealant having no inlet to one of the first and second substrates; dispensing an appropriate amount of liquid crystal to the substrate having the sealant; and bonding the two substrates to each other.

The process of forming the liquid crystal layer between the first and second substrates may be comprised of steps of forming a sealant having an inlet to one of the first and second substrates; bonding the two substrates to each other; and injecting liquid crystal to a space between the two substrates through the inlet.

Hereinafter, a printing system according to the present invention will be described with reference to the accompanying drawings.

First Embodiment

FIG. 3 is a perspective view illustrating a printing system according to the first embodiment of the present invention.

As shown in FIG. 3, the printing system according to the first embodiment of the present invention includes a moving rail 300, a cliché plate 600, a substrate 400, a printing roller 270 and a cleaning part 500. In this case, the cliché plate 600, the substrate 400 and the cleaning part 500 are positioned on the moving rail 300. The printing roller 270 is rolled on the cliché plate 600 and the substrate 400 on the moving rail 300, whereby a pattern material of the printing roller 270 is transcribed to the substrate 400.

The cleaning part 500 includes a sprayer for spraying a cleaning solution to the cliché plate 600 and a dryer for drying the cliché plate 600.

When positioning the cliché plate 600, the substrate 400 and the cleaning part 500, they are arranged in an order of the cliché plate 600, the substrate 400 and the cleaning part 500.

In the printing system according to the first embodiment of the present invention, when the printing roller 270 coated with the pattern material moves to the cliché plate 600 and the substrate 400, and returns to an origin position, the cleaning part 500 moves to the cliché plate 600 and cleans the cliché plate 600.

Second Embodiment

Figure 4:
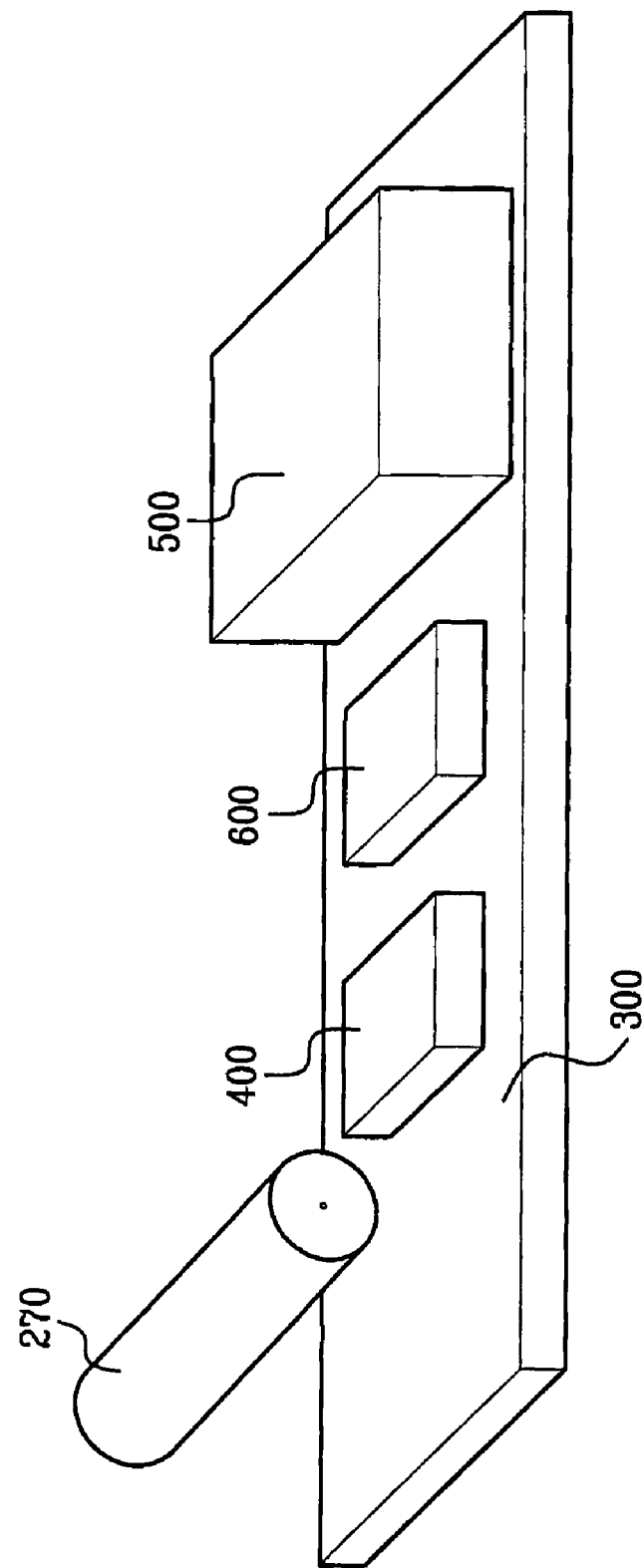
FIG. 4 is a perspective view schematically illustrating a printing system according to the second embodiment of the present invention.

FIG. 4 is a perspective view illustrating a printing system according to the second embodiment of the present invention.

As shown in FIG. 4, the printing system according to the second embodiment of the present invention includes a moving rail 300, a cliché plate 600, a substrate 400, a printing roller 270 and a cleaning part 500. In this case, the components of the printing system according to the second embodiment of the present invention are similar in structure and are dissimilar in arrangement to those of the printing system according to the first embodiment of the present invention.

In case of the printing system according to the first embodiment of the present invention, when positioning the cliché plate 600, the substrate 400 and the cleaning part 500, they are arranged in an order of the cliché plate 600, the substrate 400 and the cleaning part 500. Meanwhile, in case of the printing system according to the second embodiment of the present invention, they are arranged in an order of the substrate 400, the cliché plate 600 and the cleaning part 500.

In the printing system according to the second embodiment of the present invention, as the printing roller 270 coated with a pattern material moves to the cliché plate 600 and returns to an origin position, the pattern material of the printing roller 270 is transcribed to the cliché plate 600 and the substrate 400 in sequence. After transcribing the pattern material to the cliché plate 600, the cleaning part 500 moves to the cliché plate 600, and cleans the cliché plate 600. That is, the cleaning part 500 of the printing system according to the second embodiment of the present invention has a shorter moving distance than the cleaning part 500 of the printing system according to the first embodiment of the present invention.

Third Embodiment

Figure 5:
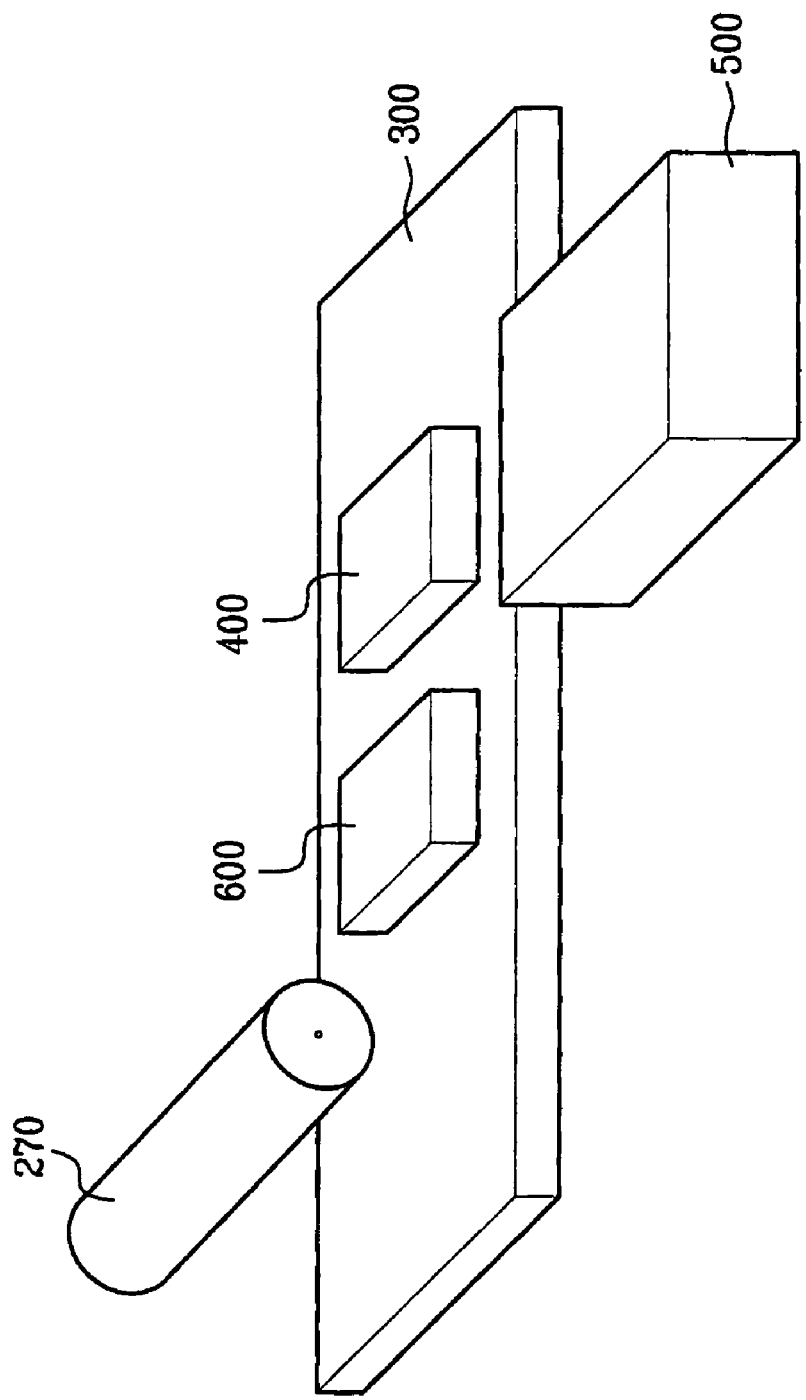
FIG. 5 is a perspective view schematically illustrating a printing system according to the third embodiment of the present invention.

FIG. 5 is a perspective view illustrating a printing system according to the third embodiment of the present invention.

As shown in FIG. 5, the printing system according to the third embodiment of the present invention includes a moving rail 300, a cliché plate 600, a substrate 400, a printing roller 270 and a cleaning part 500. In this case, the components of the printing system according to the third embodiment of the present invention are similar in structure to those of the printing system according to the first embodiment of the present invention. However, the printing system according to the third embodiment of the present invention is different in arrangement of the cleaning part 500 from the printing system according to the first embodiment of the present invention.

In the printing system according to the first embodiment of the present invention, the cleaning part 500 is positioned on the moving rail 300. In the printing system according to the third embodiment of the present invention, the cleaning part 500 is positioned at a lateral side of the cliché plate 600 outside the moving rail 300.

The printing system according to the third embodiment of the present invention is identical in operation to the printing system according to the first embodiment of the present invention.

Fourth Embodiment

Figure 6:
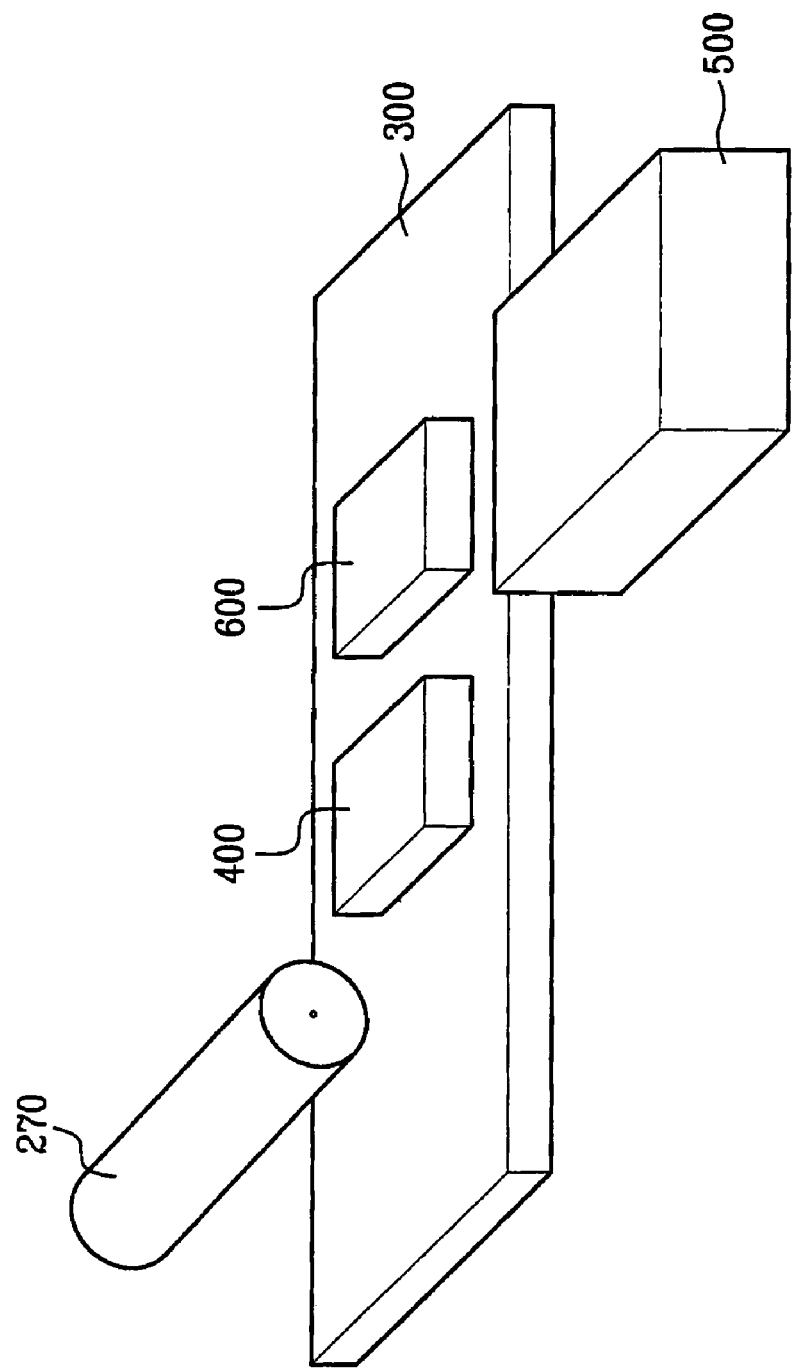
FIG. 6 is a perspective view schematically illustrating a printing system according to the fourth embodiment of the present invention.

FIG. 6 is a perspective view illustrating a printing system according to the fourth embodiment of the present invention.

As shown in FIG. 6, the printing system according to the fourth embodiment of the present invention includes a moving rail 300, a cliché plate 600, a substrate 400, a printing roller 270 and a cleaning part 500. In this case, the components of the printing system according to the fourth embodiment of the present invention are similar in structure and are dissimilar in arrangement to those of the printing system according to the third embodiment of the present invention.

In the printing system according to the third embodiment of the present invention, when positioning the cliché plate 600 and the substrate 400, they are arranged in an order of the cliché plate 600 and the substrate 400. However, in the printing system according to the fourth embodiment of the present invention, they are arranged in an order of the substrate 400 and the cliché plate 600.

The printing system according to the fourth embodiment of the present invention is identical in operation to the printing system according to the second embodiment of the present invention.

Fifth Embodiment

Figure 7:
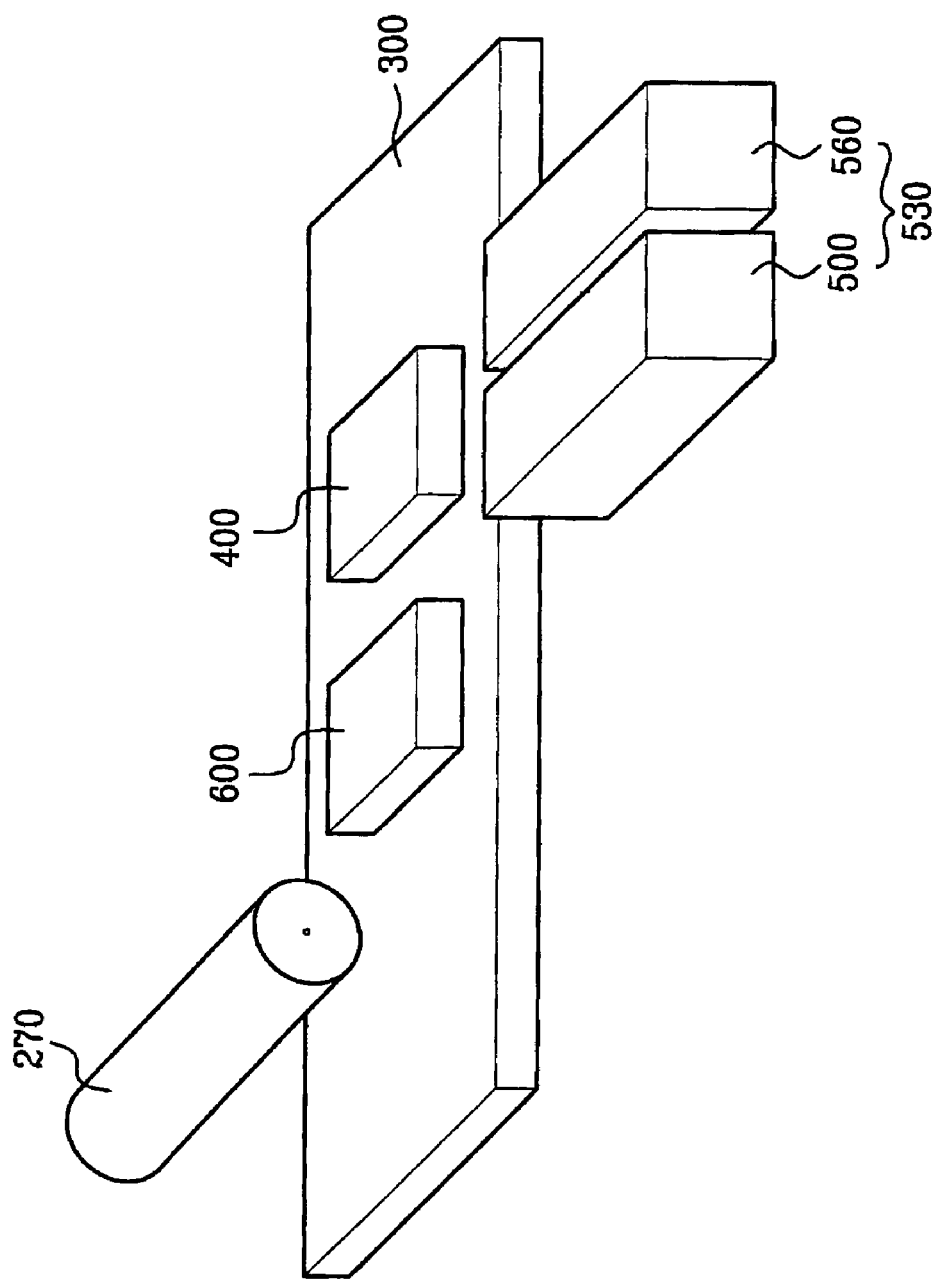
FIG. 7 is a perspective view schematically illustrating a printing system according to the fifth embodiment of the present invention.

FIG. 7 is a perspective view illustrating a printing system according to the fifth embodiment of the present invention.

As shown in FIG. 7, the printing system according to the fifth embodiment of the present invention includes a moving rail 300, a cliché plate 600, a substrate 400, a printing roller 270 and a cleaning unit 530. Except the cleaning unit 530 of the printing system according to the fifth embodiment of the present invention, the components of the printing system according to the fifth embodiment of the present invention are similar in structure and arrangement to those of the printing system according to the third embodiment of the present invention.

The cleaning unit 530 is positioned at a lateral side of the cliché plate 600. The cleaning unit 530 is comprised of a cleaning part 500 and a container 560.

After the cliché plate 600 contaminated due to a pattern material is moved to the cleaning part 500 through the moving rail 300, the cleaning part 500 cleans the cliché plate 600 by removing the remaining pattern material from the cliché plate 600. The container 560 accommodates the unused cliché plate 600 or the cliché plate 600 cleaned in the cleaning part 500. Also, the container 560 transfers the unused cliché plate 600 or the cliché plate 600 cleaned in the cleaning part 500 to the moving rail 300 when the contaminated cliché plate 600 is moved to the cleaning part 500.

Unlike the case of using only cleaning part, the cleaning unit including both the cleaning part and the container requires a transporter for transporting the cliché plate 600 to the cleaning part 500 and the container 560 since the cleaning part of the cleaning unit is positioned outside the moving rail 300.

If using the cleaning unit 530 in the printing system, the cliché plate 600 is moved to and cleaned in the cleaning part 500, and the cleaned cliché plate 600 is transferred to the moving rail 300 from the container 560. In this respect, it is possible to treat the plurality of cliché plates with one cleaning part.

Sixth Embodiment

Figure 8:
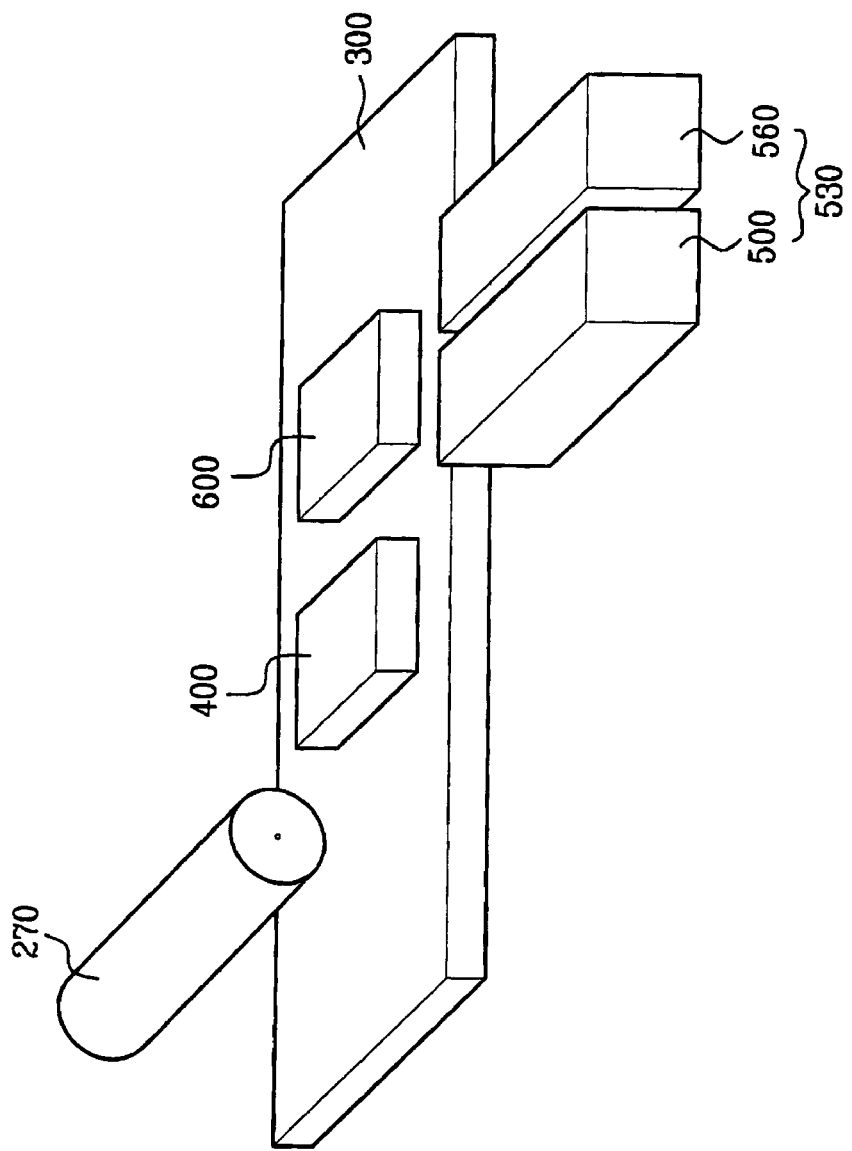
FIG. 8 is a perspective view schematically illustrating a printing system according to the sixth embodiment of the present invention.

FIG. 8 is a perspective view illustrating a printing system according to the sixth embodiment of the present invention.

As shown in FIG. 8, the printing system according to the sixth embodiment of the present invention includes a moving rail 300, a cliché plate 600, a substrate 400, a printing roller 270 and a cleaning unit 530. In this case, the components of the printing system according to the sixth embodiment of the present invention are similar in structure and are dissimilar in arrangement to those of the printing system according to the fifth embodiment of the present invention.

In the printing system according to the fifth embodiment of the present invention, when positioning the cliché plate 600 and the substrate 400 on the moving rail 300, they are arranged in an order of the cliché plate 600 and the substrate 400. In the printing system according to the sixth embodiment of the present invention, they are arranged in an order of the substrate 400 and the cliché plate 600.

Hereinafter, a method for manufacturing an LCD device according to the present invention will be described with reference to the accompanying drawings.

FIGS. 9A to 9D are cross sectional views schematically illustrating a method for manufacturing an LCD device according to the preferred embodiment of the present invention.

Figure 9A:
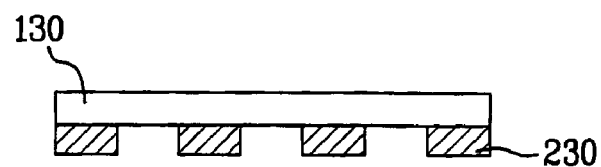
FIGS. 9A to 9D are cross sectional views schematically illustrating a method for manufacturing an LCD device according to the preferred embodiment of the present invention.
Figure 9B:
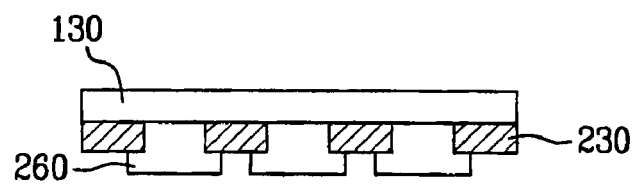

First, as shown in FIG. 9A, a light-shielding layer 230 is formed on a first substrate 130. Then, as shown in FIG. 9B, a color filter layer 260 is formed on the first substrate 130 including the light-shielding layer 230.

At least one of the processes for forming the light-shielding layer 230 (FIG. 9A) and forming the color filter layer 260 (FIG. 9B) is performed by the patterning method using the above-mentioned printing system.

Figure 9C:

Then, as shown in FIG. 9C, a second substrate 160 is prepared. Although not shown, the second substrate 160 is prepared by steps of forming gate and data lines crossing each other to define a unit pixel region on the second substrate; forming a thin film transistor adjacent to a crossing area of the gate and data lines; and forming a pixel electrode connected with the thin film transistor.

Figure 9D:
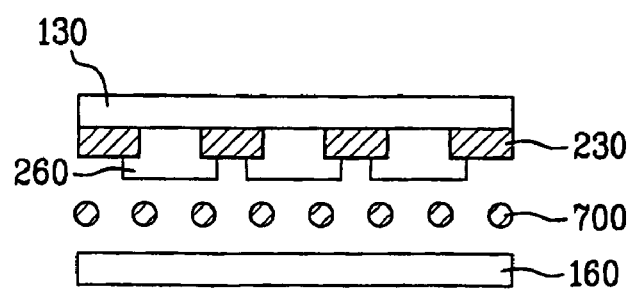

Then, as shown in FIG. 9D, a liquid crystal layer 700 is formed between the first substrate 130 and the second substrate 160.

At this time, the liquid crystal layer 700 may be formed in a liquid crystal injection method or a liquid crystal dispensing method.

The liquid crystal dispensing method includes steps of forming a sealant having no inlet to any one of the first and second substrates 130 and 160; dispensing liquid crystal to the substrate having the sealant; and bonding the first and second substrates 130 and 160 to each other.

The liquid crystal injection method includes steps of forming a sealant having an inlet to any one of the first and second substrates 130 and 160; bonding the first and second substrates 130 and 160 to each other; and injecting liquid crystal to an inner space between the first and second substrates 130 and 160 by capillary phenomenon and pressure difference.

As mentioned above, the printing system according to the present invention and the method for manufacturing the LCD device using the same have the following advantages.

The printing system according to the present invention can decrease the manufacturing cost and time since the printing system according to the present invention doesn't require the relatively high-priced mask and the exposure and development.

Also, the printing system according to the present invention includes the additional cleaning part. That is, it is possible to simplify the process if using the printing system including the cleaning part therein.

If using the cleaning unit including the cleaning part and the container, the cliché plate is moved to and cleaned in the cleaning part, and the cleaned cliché plate is transferred to the moving rail from the container. In this respect, it is possible to treat the plurality of cliché plates with one cleaning part, to thereby decrease the manufacturing cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device comprising:
   (a) positioning a cliché plate and a first substrate on a moving rail;
   (b) first, rolling a printing roller having a pattern material on the cliché plate wherein a portion of the pattern material is transcribed on the cliché plate and a portion of the pattern material remains on the printing roller; then, rolling the printing roller having the remaining portion of the pattern material on the first substrate wherein the remaining portion of the pattern material is transcribed on the first substrate;
   (c) cleaning the cliché plate after transcribing the remaining portion of the pattern material on the first substrate;
   (d) forming a light-shielding layer on the first substrate;
   (e) forming a color filter layer on the first substrate including the light-shielding layer;
   (f) preparing a second substrate; and
   (g) forming a liquid crystal layer between the first and second substrates, wherein at least one of the processes of forming the light-shielding layer on the first substrate, and forming the color filter layer on the first substrate including the light-shielding layer is performed using steps (a)-(c),
   wherein the step of the cleaning the cliché plate is performed by using a cleaning unit including a cleaning part that moves to the cliché plate for cleaning and a container for accommodating a new cliché plate and the cleaned cliché plate.

2. The method of claim 1, wherein the process of preparing the second substrate includes steps of:
   forming gate and data lines that cross each other on the second substrate, to define pixel regions;
   forming a thin film transistor adjacent to a crossing area of the gate and data lines;
   forming a passivation layer on the first substrate including the thin film transistor; and
   forming a pixel electrode on the passivation layer, the pixel electrode connected with a drain electrode of the thin film transistor, wherein the process of the preparing the second substrate is performed with the printing system.

3. The method of claim 1, wherein the process of forming the liquid crystal layer between the first and second substrates includes steps of:
   forming a sealant that has no inlet to any one of the first and second substrates;
   dispensing an appropriate amount of liquid crystal to the substrate that has the sealant; and
   bonding the two substrates to each other.

4. The method of claim 1, wherein the process of forming the liquid crystal layer between the first and second substrates includes steps of:
   forming a sealant that has an inlet to any one of the first and second substrates;
   bonding the two substrates to each other; and
   injecting liquid crystal to a space between the first and second substrates.

5. The method of claim 1, wherein the cleaning part moves onto the moving rail and cleans the cliché plate.

6. The method of claim 5, wherein the cliché plate, the substrate and the cleaning unit are sequentially arranged in line.

7. The method of claim 5, wherein the substrate, the cliché plate and the cleaning unit are sequentially arranged in line.

8. The method of claim 5, wherein the cleaning part is provided outside the moving rail.

9. The method of claim 8, wherein the cliché plate and the substrate are sequentially arranged in line.

10. The method of claim 8, wherein the substrate and the cliché plate are sequentially arranged in line.

11. The method of claim 8, wherein the cleaning part is positioned at a lateral side of the cliché plate outside the moving rail.

12. The method of claim 5, wherein the cleaning part includes a cleaning solution sprayer and a dryer.

13. The method of claim 1, wherein the cleaning unit is positioned outside the moving rail.

14. The method of claim 13, wherein the cliché plate and the substrate are sequentially arranged in line.

15. The method of claim 13, wherein the substrate and the cliché plate are sequentially arranged in line.

16. The method of claim 13, wherein the cleaning unit is positioned at a lateral side of the cliché plate outside the moving rail.

17. The method of claim 1, wherein the cleaning unit includes a cleaning solution sprayer and a dryer.

18. The method of claim 1, wherein the cleaning unit includes a transporter that transports the cliché plate.

* * * * *